DOUBLE BOUNCE SECOND SIGNAL RETURN FILTER CORRECTED FMCW RADIO ALTIMETER

Filed June 1, 1967 4 Sheets-Sheet 1

INVENTORS
KENNETH J. ENGHOLM
JOHN B. MAJERUS
ALAN D. SNODGRASS
CHARLES A. WEBER

BY Moody and Kintzinger
ATTORNEYS

INVENTORS
KENNETH J. ENGHOLM
JOHN B. MAJERUS
ALAN D. SNODGRASS
CHARLES A. WEBER

BY Moody and Kintzinger
ATTORNEYS

INVENTORS
KENNETH J. ENGHOLM
JOHN B. MAJERUS
ALAN D. SNODGRASS
CHARLES A. WEBER

BY Moody and Kintzinger
ATTORNEYS

INVENTORS
KENNETH J. ENGHOLM
JOHN B. MAJERUS
ALAN D. SNODGRASS
CHARLES A. WEBER
BY Moody and Kintzinger
ATTORNEYS

United States Patent Office

3,403,398

Patented Sept. 24, 1968

3,403,398

DOUBLE BOUNCE SECOND SIGNAL RETURN FILTER CORRECTED FMCW RADIO ALTIMETER

Kenneth J. Engholm, Cedar Rapids, John B. Majerus, Marion, Alan D. Snodgrass, Cedar Rapids, and Charles A. Weber, Marion, Iowa, assignors to Collins Radio Company, Cedar Rapids, Iowa, a corporation of Iowa Filed June 1, 1967, Ser. No. 642,831

10 Claims. (Cl. 343—14)

ABSTRACT OF THE DISCLOSURE

A filter circuit for a swept FMCW type radio altimeter system using a monostable multivibrator passing an output through a low pass filter to a voltage comparator circuit for developing a controlling feedback voltage to the monostable multivibrator. This provides a control of the monostable multivibrator active periods and coexistent waveform percentage dead time to a predetermined percentage of the input signal cycle periods. This provides for effective tracking of the frequency difference between the transmitted signal and the received ground reflected return signal and simultaneous filtering substantially complete attenuation rejection of difference signals between the transmitted signal and double bounce received signals. A monitor circuit used with the filter circuit compares the signal input to, and the output of the monostable multivibrator. When there is a difference between the two signals persisting beyond a time delay of approximately one half second then a switch trigger circuit is activated to provide a voltage signal through a differentiator circuit to the comparator circuit and thereby controlled adjustment of the monostable multivibrator to a higher frequency difference. A flag alarm is also connected for activation by the switch trigger circuit.

This invention relates in general to radio altimeters, and in particular, to an FMCW radio altimeter equipped with means for protective filtering of the propagation phenomenon called double bounce.

Double bounce has been anticipated for years as a possible propagation phenomenon difficulty that with radio altimetry could be a hazard of significant consequence. This has actually been verified in fact with implementation of radio altimeters and altimetry practice in commercial aircraft in increasingly large numbers, and it is a particularly troublesome factor showing up with flight paths over, for example, certain critical sea bordering states.

Various radio altimeter systems using a swept FMCW principle of operation measure ground clearance by transmitting to the ground a continuous frequency modulated signal with a small amount of the transmitted signal energy and the reflected signal energy from the ground being fed to a receiver where they are mixed and a difference frequency $F_R$ obtained. With these radio altimeters since the signal reflected from the ground is delayed from the transmitted signal by the signal propagation delay, $F_R$ will be a frequency greater than zero and proportional to the propagation delay. This is with propagation delay including a fixed delay, due to antenna cables, transmission lines and the like, and a variable delay proportional to the aircraft ground clearance. With one radio altimeter, the rate of frequency change with time is such that, for example, at touchdown, the difference frequency $F_R$ is about 1,000 cycles per second and increases 40 c.p.s. per foot of clearance to 101,000 c.p.s. at a ceiling of approximately 2,500 feet. If the signal reflected from the ground reflects from the aircraft and makes another round trip, and this gives rise to the particular problem dealt with here, a second value of difference frequency $F_R'$ results that can approach the second harmonic of $F_R$. The exact harmonic relationship is never attainable since the fixed delay does not contribute to propagation delay with the second round trip bounce reflection from the aircraft down to the ground and back to aircraft again. By way of illustration with respect to an altitude of 1,500 feet:

$$F_R=1,000+40\ (1,500)=61,000 \text{ c.p.s.}$$

and $$F_R'=61,000+40\ (1,500)=121,000 \text{ c.p.s.}$$

and with the ratio of $$F_R'/F_R=121/61=1.98$$

and then with reference to an altitude of 50 feet:

$$F_R=1,000+40\ (50)=3,000 \text{ c.p.s.}$$

and $$F_R'=3,000+40\ (50)=5,000 \text{ c.p.s.}$$

and with the ratio of $$F_R'/F_R=5/3=1.67$$

Please note that with many of these radio altimeters since a circuit, such as a zero crossing counter in the altimeter, converts the difference frequency to a D.C. voltage driving the indicator, and with the double bounce phenomena occurring intermittently, the counter is randomly exposed to $F_R'$ as well as $F_R$. This results in random jumps of indicated altitude in the upward direction with erratic and erroneous altimeter indications. This is a problem that may be solved by insertion of a filter between the receiver and the counter circuit, with the filter self-tracking at $F_R$ and continually providing a great amount of attenuation at the frequency $F_R'$ in order that the counter circuit never be exposed to the frequency $F_R'$.

With the use of a self-tracking filter between the receiver and the counter circuit of a radio altimeter an occasional ambiguous condition may arise in the filter system from time to time. An example of when such an ambiguous condition would arise is if the filter is tracking $F_R$ at any given time and $F_R$ suddenly increases by more than 1.67 times, actually the cutoff frequency rate figure for a 60% dead time, a factor more completely described hereinafter, as, for instance, when the aerodynamic path of the aircraft continues over the edge of a cliff the filter output may be corrected from a countdown condition. This may be accomplished with a monitor circuit, not only warning of the ambiguous condition, but with the persistence of such signal input conditions beyond, for example, a time lag of perhaps a half a second, a correction, through the loop corrective action of the filter circuit, to the timing of the new input signal. Further, such a monitor circuit may be equipped to provide warning not only of such an ambiguous condition as well as the corrective procedure for such conditions, but also to provide warning in the event of component failures in the filter system.

It is, therefore, a principal object of this invention to provide a radio altimeter utilizing the swept FMCW mode of operation with protection from what is known as the radio altimeter double bounce phenomena and erratic and erroneous altimeter reading indications resulting from such phenomena.

Another object is to provide such a radio altimeter with a filter system self-tracking at the fundamental frequency difference engendered by the first signal return from the ground and the transmitted signal, and having great attenuation to the difference frequency obtained with any double bounce or multiple bounce signals reflected back from the plane to the ground and again to the plane in an extra round trip, or with multiple round trips.

A further object is to provide such a radio altimeter system with sudden altitude change ambiguous condition corrective capabilities and warning capabilities when such conditions exist and also when component failures may occur in the filter system.

Features of this invention useful in accomplishing the above objects include, in an FMCW radio altimeter system using the swept FMCW principle of operation, the addition of a filter circuit designed for passing the frequency difference between the transmitted frequency signal and the first return of the transmitted signal reflected from the ground, and for filtering attenuation of intermittently received double bounce signals. This is with respect to the difference signal resulting from signal return reflected from the ground being reflected from the aircraft and down to the ground again and back to the aircraft again, through a second round trip, and those that may even have multiple reflected round trips. The filter is self-tracking at the fundamental frequency difference with a monostable multivibrator having, for example, a 60 percent dead time, that is, active time for the monostable multivibrator with respect to the timing between input triggers from the receiver as determined by the difference frequency rate between the transmitted signal and the first reflected return signal, with the 60 percent dead time being continuously varied to match the particular difference frequency being received as an input thereto from the receiver. This is accomplished with the output of a monostable multivibrator being passed to and through a low pass filter to a comparator circuit connected to a reference voltage source, and with the resulting voltage output of the comparator circuit fed back as a timing control voltage to the monostable multivibrator for varying the dead time to maintain a percentage dead time matching the period between cycles of the difference voltage timed trigger inputs from the receiver. The output of the monostable multivibrator is also passed to a differentiator developing an output driving a counter circuit with an output driving an indicator. A further feature that may be included is a monitor circuit receiving as inputs the trigger input signals from the receiver and also the output of the monostable multivibrator. The monitor circuit is equipped with both an output to a flag alarm that may be located with the indicator of the system, and also a connection to the comparator circuit. When there is a difference between the signal input triggers from the receiver and the output of the monostable multivibrator continuing through and after a time lag of approximately a half a second, the flag alarm will be activated and a signal will be fed to the comparator. This signal enables the filter system to correct from the countdown condition to the specific trigger inputs at the new input frequency in order to avoid ambiguity that is likely to occur at such time as the flight path of the aircraft is over a cliff with a jump in actual altitude by approximately a factor of two from the terrain immediately therebelow.

A specific embodiment representing what is presently regarded as the best mode of carrying out the invention is illustrated in the accompanying drawings.

In the drawings:

FIGURE 1 represents a block diagram of a radio altimeter system utilizing the swept FMCW principle of operation with a filter circuit included between the receiver and counter circuit of the altimeter system;

FIGURE 2, a frequency versus time graph of the RF transmitted signal as a solid saw tooth line, the first ground reflected return received signal as a dashed saw tooth line duplicating the transmitted signal line and with the difference frequency that give a measure of the altitude for any particular instant of time being the vertical frequency difference between the transmitted and the received signal lines;

FIGURE 3, a block diagram of the filter circuit of FIGURE 1 and including a filter monitor circuit that may be advantageously employed with the filter circuit;

FIGURE 4, voltage versus time waveforms showing three differentiated waveform input trigger signal and the resulting outputs from the monostable multivibrator circuit of the filter and out of a differentiator passed to a counter circuit of the altimeter system;

FIGURE 7 is a series of voltage versus time waveforms illustrating conditions with various waveforms that the monitor circuit senses and corrects for.

Figure 1:
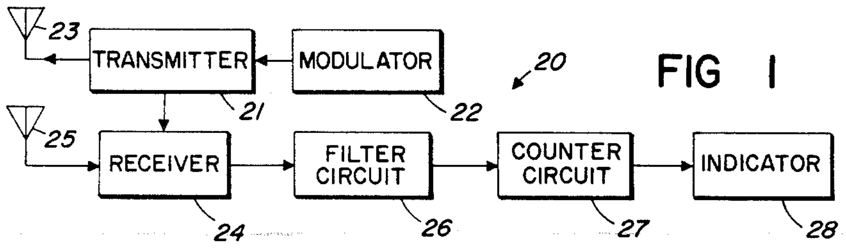

Referring to the drawings:

The radio altimeter system 20 of FIGURE 1 is one utilizing the swept FMCW principle of operation and is shown to include an RF transmitter 21 receiving a modulating signal from a modulator circuit 22 and feeding a transmitter output signal to the transmitting antenna 23. The transmitter 21 in this system also provides a low power output component of its transmitted signal directly to an RF receiver 24 also receiving the reflected signal originally transmitted from the RF transmitting antenna 23 reflected from the ground back to receiving antenna 25 as an additional input to the RF receiver 24. The signal output of the receiver is shown to be fed to filter circuit 26, with an output applied as an input to counter circuit 27, the output of which is the driving input to indicator 28. Many existing radio altimeters, particularly those using the swept FMCW principle of operation, apply the output of the RF receiver 24 directly to the counter circuit 27 for ultimately developing an indicator 28 reading. Filter circuit 26, however, is a newly added circuit in the system added primarily for the elimination of double bounce or multiple bounce signal frequency signals being passed to the counter circuit 27 to minimize or eliminate any erratic readings of indicator 28 otherwise caused by such phenomenon.

Figure 2:
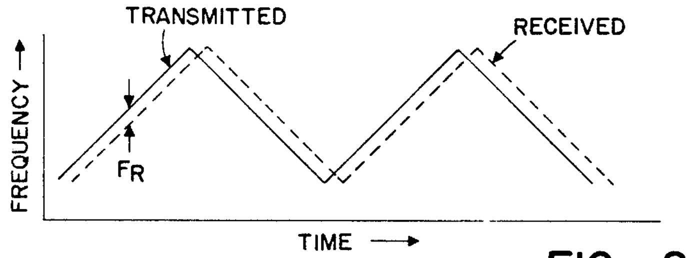

Such altimeter systems measure ground clearance by transmission to the ground of a continuous frequency modulated signal such as illustrated by the frequency versus time graph of FIGURE 2. This not only shows the transmitted signal as a solid sawtooth line, but also the first received ground reflected signal resulting from the transmitted signal as a dashed sawtooth line. These two signals, illustrated on this graph, represent a small amount of the transmitted signal energy and the received reflected signal from the ground that are mixed in the receiver 24. The difference frequency for any particular instance of time being continuously generated is represented by the distance $F_R$ illustrated in FIGURE 2 as the vertical distance $F_R$ between the two curves. Since the signal reflected from the ground is delayed from the transmitted signal by propagation delay including a fixed delay due to antenna cables, transmission lines, and the like, and a variable delay proportional to aircraft ground clearance the difference frequency $F_R$ is always a frequency greater than zero and proportional to the signal propagation delay. Various existing radio altimeters utilizing the swept FMCW principle and those that are equipped with the double bounce protective attenuating filter circuit generally have been set to operate through a 100 megacycle range ±50 megacycles about a 4,300 megacycle frequency with each sweep occurring at a sweep rate of 100 megacycles per 5 milliseconds. It is of interest to note that the turn around periods of each extreme of the sawtooth waveforms is of such relatively short duration as to have no significant material effect upon the operational results of these altimeters.

Figure 3:
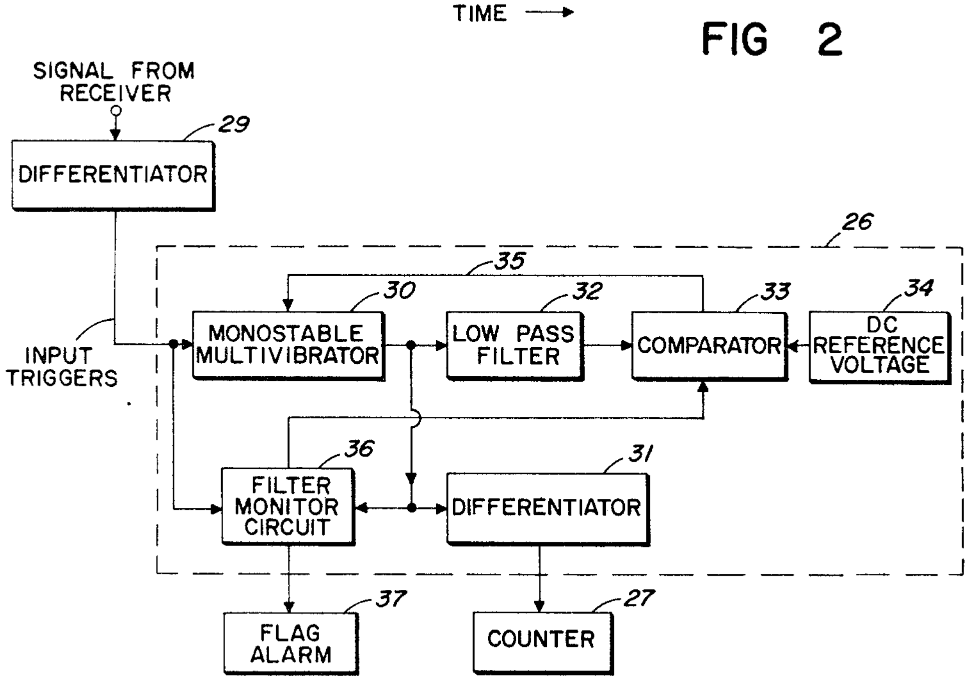
Figure 4:
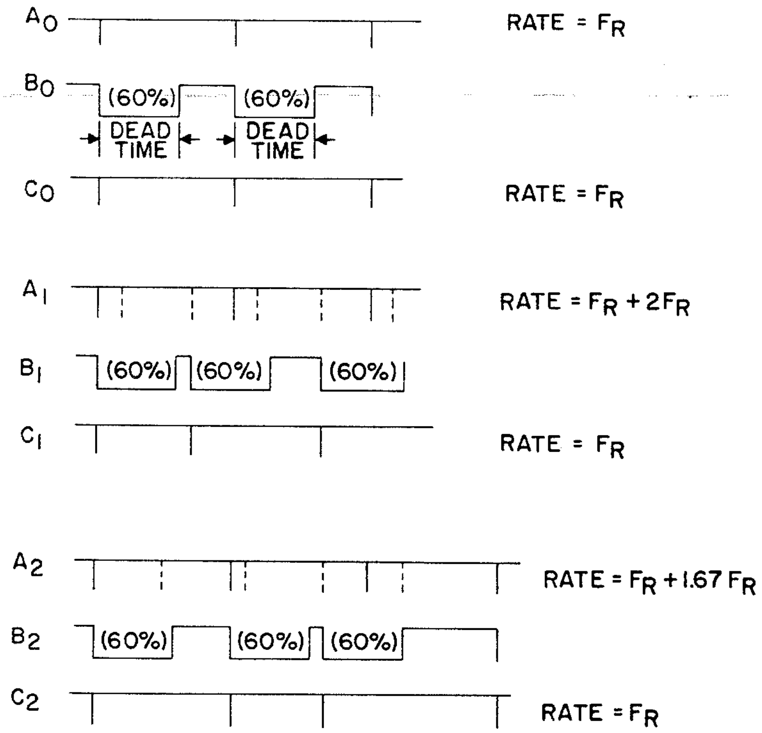

Referring now also to the block diagram of FIGURE 3, the difference frequency $F_R$ initially sinusoidal in nature before being applied to a squaring circuit, such as a Schmitt trigger circuit that has been employed with various existing radio altimeters, is in the square waveform out of the Schmitt trigger circuit applied to a differentiator circuit 29. This differentiator may, as a matter of convenience, be included in receiver 24, as part of interface circuitry between the receiver 24 and the filter 26, or, if desired, included as part of the filter circuit 26. The resulting differentiated waveform, such as the pipped trigger pulse waveform $A_0$ in FIGURE 4, is applied as an input to the filter circuit 26 being passed to the monostable multivibrator circuit 30. An output of multivibrator circuit 30 is extended to a differentiator circuit 31 having an output connection as an output of the filter circuit to the counter circuit 27. An output connection of multivibrator circuit 30 is also an input to and through low pass filter 32 to a comparator circuit 33 having DC reference voltage connection with DC reference voltage source 34. A control voltage feedback line 35 extends from the comparator circuit 33 back to and as a percentage dead time controlling voltage input to the monostable multivibrator circuit 30. Another output connection of the monostable multivibrator 30 extends to a filter monitor circuit 36 receiving as another input the output of differentiator circuit 29 also passed as an input to the monostable multivibrator circuit 30. The filter monitor circuit 36 has an output signal connection back to the comparator circuit 33 as an additional occasional correction voltage input source to the comparator circuit 33, and is also provided with an output flag alarm circuit 37 activating connection.

Figure 5:
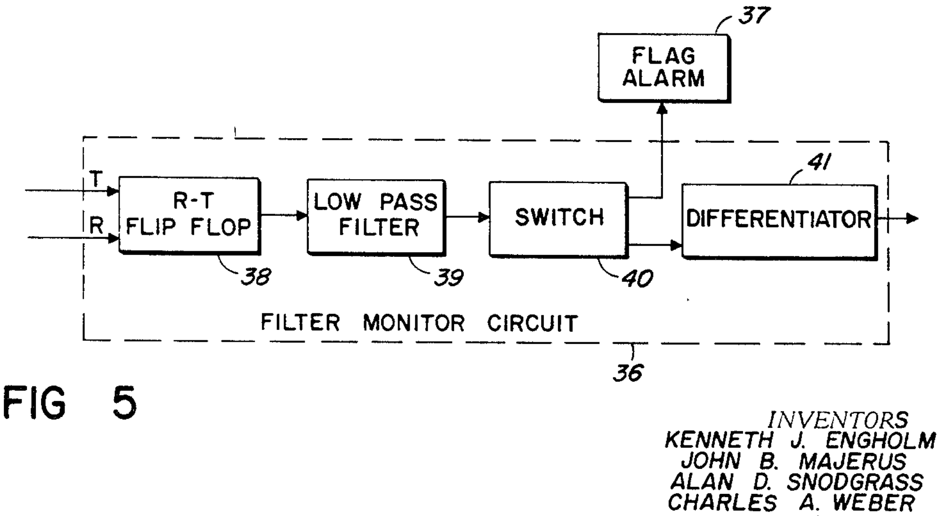
FIGURE 5, is a block diagram of the filter monitor circuit in greater detail.

Referring now to the block diagram FIGURE 5 showing of the filter monitor circuit 36, the $A_0$ pulsed waveform input from the differentiator 29 to the filter monitor circuit 36 is connected to the toggle input terminal T of an RT flip-flop circuit 38 and an output connection of the monostable multivibrator circuit 30 of filter circuit 26 is to the reset terminal R input connection of the RT flip-flop circuit 38. The output connection of the RT flip-flop circuit 38 is passed to and through a low pass filter 39 to a switch device 40 having two output connections one to flag alarm 37 and the other to a differentiator circuit 41, the output of which is connected as the corrective voltage signal connection from the filter monitor circuit to the comparator circuit 33 of the filter circuit 26.

Figure 6:
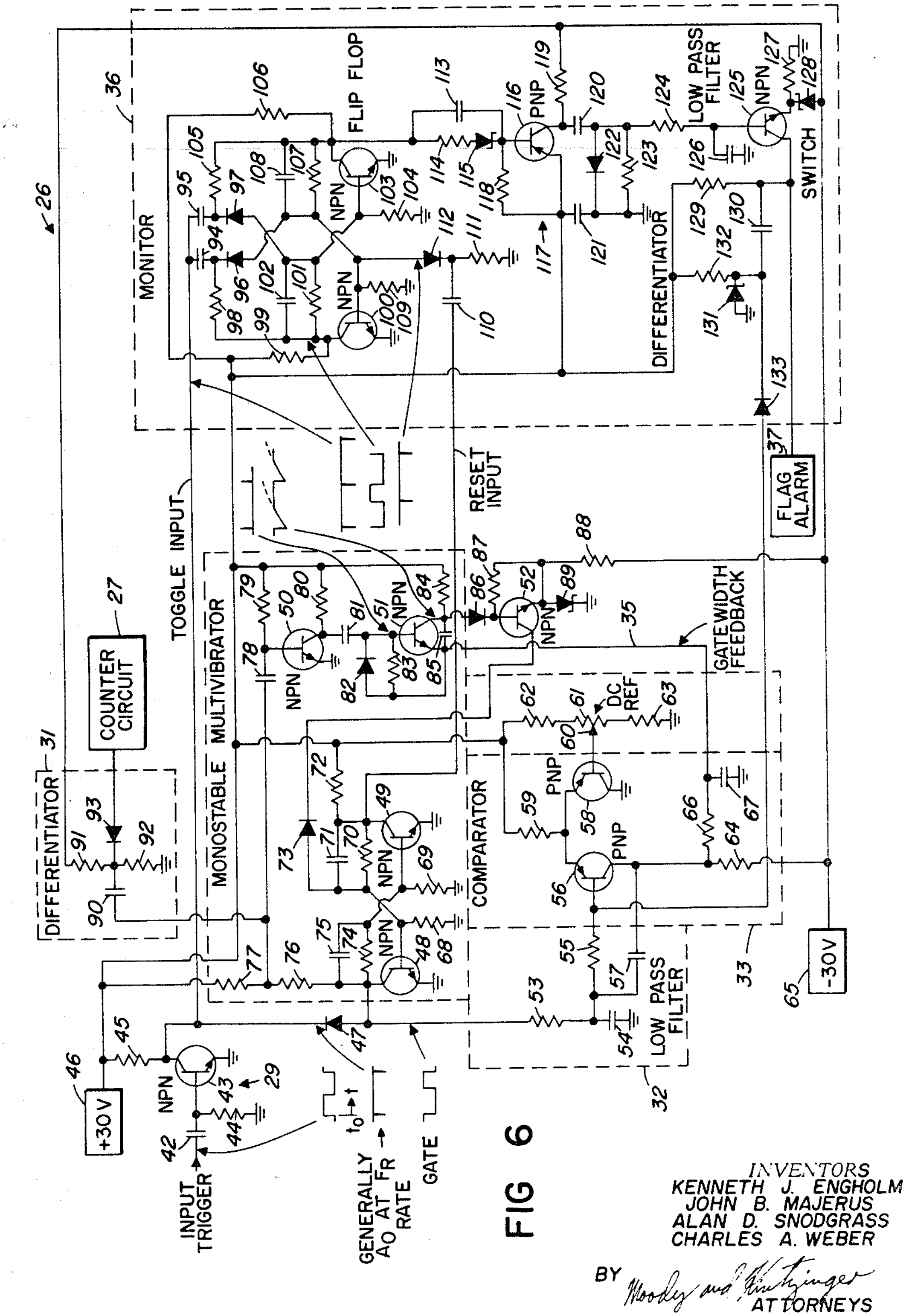
FIGURE 6, is a detailed schematic of a working embodiment of the filter circuit, and including the filter monitor circuit.

With reference to the schematic showing of FIGURE 6, a specific implementation with circuit sections from the differentiator circuit 29, particularly circuit sections in the filter circuit 26 and the various subcircuits of the filter monitor circuit 36 is shown in detail. The output of a trigger circuit such as a Schmitt trigger circuit, detail not shown, in receiver 24 is passed as an input to differentiator circuit 29, in the form of a trigger amplifier, for producing the trigger pulse waveform $A_0$ as shown in FIGURE 4. The differentiator trigger amplifier circuit 29 also serves as interface function between the receiver 24 and the filter circuit 26. The input to this circuit is passed through capacitor 42 to the base of NPN transistor 43 with the junction of the capacitor 42 and the base of transistor 43 connected through resistor 44 to ground and the emitter of the transistor 43 connected to ground. The signal output collector is connected through resistor 45 to positive voltage supply 46. The collector output of the transistor 43 and of differentiator circuit 29 is passed to the cathode of diode 47 having its anode connected to the collector of NPN transistor 48 as the $A_0$ trigger pulsed waveform input to the monostable multivibrator circuit 30 including NPN transistors 48, 49, 50, 51, and 52. The square wave waveform, such as the $B_0$ waveform of FIGURE 4, developed at the junction of the anode of diode 47 and the collector of NPN transistor 48 by the action of the monostable multivibrator circuit 30 is passed as an input to low pass filter circuit 32 including a connection serially through resistor 53 and capacitor 54 to ground. The junction of resistor 53 and capacitor 54 is connected through resistor 55 to the base of PNP transistor 56 of the comparator circuit 33 and the junction of resistor 53 and capacitor 54 is also connected through capacitor 57 to the collector of PNP transistor 56 in the comparator circuit. These base and collector connections from the LP filter circuit 32 to the PNP transistor 56 comprise an input to the comparator circuit 33.

PNP transistor 56 of the comparator circuit 33 has a common emitter connection with PNP transistor 58 and the common emitter connection between transistors 56 and 58 is connected through resistor 59 to positive voltage supply 46. The collector of PNP transistor 58 is connected to ground while the base is connected to tap 60 of the center resistor 61 of three resistors 62, 61 and 63, serially connected between positive voltage source 46 and ground, to comprise DC reference voltage source 34. The signal output collector of PNP transistor 56 in the comparator circuit 33 is connected through resistor 64 to negative voltage supply 65, and the signal output path from the collector of PNP transistor 56 extends from the junction of the collector and resistor 64 through resistor 66 to the emitter of NPN transistor 51 in the monostable multivibrator circuit 30. The connective junction of resistor 66 with the emitter of NPN transistor 51 is connected through capacitor 67 to ground within the comparator circuit 33. This comparator output line connection to the emitter of NPN transistor 51 is a gate width feedback control voltage output from the comparator circuit 33 to the monostable multivibrator 30 for controlling active pulse time of the monostable multivibrator circuit and the coincident therewith percentage dead time of the $B_0$ waveform as shown in FIGURE 4.

In the monostable multivibrator circuit 30, the emitters of both NPN transistor 48 and 49 are connected to ground and the bases of the transistors are also connected through resistors 68 and 69, respectively, to ground. The base of NPN transistor 48 is also connected through resistor 70 and capacitor 71, in parallel, to the collector of transistor 49 having a voltage bias connection through resistor 72 to the positive voltage supply 46. The base of NPN transistor 48 is also connected through to the anode of diode 73 and through the diode 73 to the collector of monostable multivibrator NPN transistor 52. The base of NPN transistor 49 is connected through resistor 74 and capacitor 75, in parallel, to the collector of NPN transistor 48. The junction of the anode of diode 47 and the collector of NPN transistor 48 is also connected serially through resistors 76 and 77 to positive voltage supply 46. Further, the junction of resistors 76 and 77 is connected as a signal output point from the monostable multivibrator circuit 30 and an input to the differentiator circuit 31, and also through capacitor 78 back to the base of NPN transistor 50 as an additional signal loop in the monostable multivibrator circuit 30.

The emitter of NPN transistor 50 is connected to ground while the junction of capacitor 78 and the base of the transistor are connected through resistor 79 to the positive voltage supply 46, and the signal output collector of NPN transistor 50 is connected both through resistor 80 to the positive voltage supply 46, and through capacitor 81 to the base of NPN transistor 51. The common junction of capacitor 81 and the base of NPN transistor 51 is connected to the cathode of diode 82 and through the diode 82 in parallel with resistor 83 to the emitter of NPN transistor 51 and its connection with the gatewidth feedback signal controlling connective line with the comparator circuit 33. The collector of NPN transistor 51 is connected through resistor 84 to the positive voltage supply 46 and there is a connection between the emitter and collector of transistor 51 through capacitor 85.

The signal output collector of NPN transistor 51 is also connected to the anode of diode 86 and through the diode with the signal path extending to the base of NPN transistor 52. The junction of the cathode of diode 86 and the base of NPN transistor 52 is connected serially through resistors 87 and 88 to the negative voltage supply 65 and the common junction of resistors 87 and 88 is connected to the junction of the emitter of NPN transistor 52 and the anode of Zener diode 89 having a cathode connection to ground. The collector of NPN transistor 52 is connected in a signal path connection to the cathode of diode 73 and through the diode 73 for effectively controlling dead time or gatewidth of the square wave waveform developed at the junction of diode 47 and the collector of NPN transistor 48 through the monostable multivibrator waveform shaping action. Please note that samples of the waveforms generally developed at various locations in the circuitry are indicated to further facilitate an easy ready understanding of operation of the subject circuitry.

The signal output connection of the monostable multivibrator circuit 30 from the common junction of resistors 76 and 77 to the differentiator circuit 31 is through capacitor 90 in the differentiator circuit 31 to the common junction of resistors 91 and 92 connected serially between the negative voltage supply 65 and ground, and this common connection also includes the cathode of diode 93. The anode of diode 93 is connected to the counter circuit 27 as the output path to the counter and ultimately to the indicator of the altimeter system.

This filter circuitry described herein would generally provide satisfactory operational results most of the time except for occasional ambiguous situations arising, for example, when a plane were to fly in a flight path passing over a cliff with a sudden increase in altitude of the aircraft relative to the ground level directly below. Protection from such ambiguous altimeter indicating conditions that may arise by such an occurrence are provided for by a monitor circuit 36 connected for receiving normally the trigger pulse $A_0$ waveform differentiated from a Schmitt trigger square pulse waveform input through differentiating trigger amplifier circuit 29. The NPN transistor 43 collector output is connected as a toggle input to the monitor circuit 36. This initial input is a toggle T terminal input to flip-flop circuit 38 through a common connection with capacitors 94 and 95 and through the capacitors to the cathodes of diodes 96 and 97, respectively. The common junction of capacitor 94 and the cathode of diode 96 is connected serially through resistors 98 and 99 to the positive voltage supply 46. The common junction of resistors 98 and 99 is not only connected to the collector of NPN transistor 100, but also through resistor 101 and capacitor 102 in parallel to the common junction of the anode of diode 97 and the base of NPN transistor 103, and also on from this common junction through a resistor 104 to ground. The common junction of capacitor 95 and the cathode of diode 97 is connected serially through resistors 105 and 106 to the positive voltage supply 46. The common junction of the resistors 105 and 106 is connected to the collector of NPN transistor 103, and also through resistor 107 in parallel with capacitor 108 to the common junction of the anode of diode 96 and the base of resistor 100, and also on through resistor 109 to ground. A reset signal input from the collector NPN transistor 49 of the monostable multivibrator circuit 30 is connected as a reset R terminal input to the flip-flop circuit 38 through capacitor 110 to the common junction of resistor 111, connected at the other end to ground, and the cathode of diode 112, having an anode connection input signal path to the common junction of the base NPN transistor 101, resistor 109, resistor 107, capacitor 108 and the anode of diode 96. The signal output path connection of the flip-flop circuit 38 includes a connection through the capacitor 113 and through series connected resistor 114 and Zener diode 115, connected in parallel with capacitor 113, to the base of PNP transistor 116, of driver amplifier circuit 117. This is with the cathode of the Zener diode connected to the common junction of capacitor 113 and the base of the PNP transistor 116, and with this common junction having a connection to positive voltage supply 46 through resistor 118. The emitter of PNP transistor 116 is directly connected to positive voltage supply 46 and the signal output collector of the transistor is connected through resistor 119 to negative voltage supply 65, and in the signal output path through capacitor 120 to the low pass filter circuit 39. The driver amplifier circuit 117 also includes a capacitor 121 connected between the positive voltage supply 46 and ground, and the signal output side of capacitor 120 is connected to the anode of diode 122 and through the diode to ground and also through a resistor 123, in parallel with diode 122, to ground.

The low pass filter 39 includes a resistor 124 serially in the signal path to the base of NPN transistor 125 of switch circuit 40. The LP filter circuit 39 also includes a capacitor 126 connected between the common junction of resistor 124 and the base of NPN transistor 125 and ground. In switch circuit 40 the emitter of NPN transistor 125 is connected through resistor 127 to ground and also to the cathode of Zener diode 128 and through the diode to negative voltage supply 65. The signal collector output connection of NPN transistor 125 is to the flag alarm 37, and also includes a bias connection through resistor 129 to the positive voltage supply 46. It is also provided with a connection serially through capacitor 130 anda Zener diode 131 to ground. The junction of the cathode of the Zener diode 131 and capacitor 130 is provided with a bias connection through resistor 132 to the positive voltage supply 46, and this common connection between the cathode of Zener diode 131 and capacitor 130 is also connected to the cathode of diode 133 and through the diode 133 in a signal path connection to the common junction of resistor 55 and the base of PNP transistor 56 in the comparator circuit 33. This provides for corrective monitor derived signal corrective input to the comparator for counting down or adjusting the frequency of the monostable multivibrator to a new frequency after a brief delay interval consistent with the altitude change as may occur when the aircraft flight path is over a cliff and there is a sudden change in altitude of the aircraft relative to the terrain immediately below.

With one such filter equipped radio altimeter using the swept FMCW principle of operation the difference frequency $F_R$ is about 1,000 c.p.s. at touch down and increases at a rate of approximately 40 cycles per second per foot of clearance to 101,000 c.p.s. at a ceiling of approximately 2,500 feet. The counter circuit 27 is a zero crossing counter circuit converting the difference frequency $F_R$ as passed by the monostable multivibrator 30 and differentiator 31, to a DC voltage driving the indicator 28. With this altimeter system the filter trigger pulses of the trigger pulse $A_0$ waveform of FIGURE 4 at the difference frequency rate of $F_R$ trigger the monostable multivibrator 30 which has been preset and adjusted to have an active period labelled dead time between the limits of 50% and 100% and actually 60% in the particular $B_0$ square wave waveform illustrated in FIGURE 4. The output of the multivibrator circuit 30 as differentiated through differentiator circuit 31 provides the $C_0$ counter trigger waveform at a frequency rate equal to the difference frequency $F_R$. Please note that characteristically the multivibrator is such a circuit as to not be subject to retriggering during the dead time. If, for example, for any particular value of $F_R$ the multivibrator circuit is adjusted to a dead time of 60% of the interpulse period of $F_R$ the multivibrator acts as a filter with a cutoff frequency of $F_R/0.6=1.67\ F_R$. Thus, attenuation to frequencies above 1.67 $F_R$ approach infinity since the multivibrator cannot retrigger on pulses falling within the dead time.

The waveform $A_1$ of FIGURE 4 shows a pulse rate of $F_R+F_R'\approx F_R+2F_R$ and the resulting multivibrator action in the square waveform $B_1$ with the 60% dead time periods and $C_1$ the resulting differentiated trigger waveform derived from the monostable multivibrator output and passed to the counter circuit. Waveforms $A_1$, $B_1$, and $C_1$ illustrated the filtering action whereby $F_R'$ is removed and not presented to the counter circuit. It should be noted that phasing of $F_R$ and $F_R'$ at $A_1$ is an arbitrary choice and the filtering action may occur at any other phase. The waveforms $A_2$, $B_2$, and $C_2$ of FIGURE 4 show filtering action when $F_R+F_R'=F_R+1.67\ F_R$ with the $A_2$ input signal waveform.

Since the difference frequency $F_R$ varies, for example, in a particular altimeter system from approximately 1,000 c.p.s. to 101,000 c.p.s., the filter system includes a voltage control for varying the multivibrator gating by means of a DC control voltage passed through the gate width feedback line 35 from the comparator circuit 33 back to the monostable multivibrator 30. This system provides an accurate control of the length of the active period of the multivibrator so that a given dead time such as a 60% dead time as shown in the $B_0$ waveform of FIGURE 4, and other such waveform showings illustrated in the drawings, is maintained throughout the complete operational range of difference frequencies $F_R$ developed. The output of the multivibrator is fed to a low pass filter 32 for developing a DC voltage fed into the comparator circuit 33 that is an actual measure of the percent dead time of the signal out of the monostable multivibrator circuit 30. This DC voltage is compared with a reference voltage within the comparator and voltage gain is also introduced in the comparator circuit 33 to provide a resultant DC voltage comparator output fed back through line 35 as the control voltage for the multivibrator 30. This provides a closed loop regulation tracking system such that a constant percentage dead time for any value of $F_R$ is attained.

It should be noted that with many multivibrator circuits there is a recovery time following each active period so that the multivibrator circuit cannot be reliably triggered until some time following termination of the active period. With some simple multivibrator configurations, the recovery time is an appreciable percentage of the active period. Further, since the closed loop senses only the active gate, tracking accuracy is impaired if the multivibrator does have appreciable recovery time. Such problems are circumvented with the particular circuit illustrated and the particular monostable multivibrator used since it is set during the time of the input trigger pulse and requires no recovery time. During actual operation the signal generally presented to the filter circuit 26 is normally the difference frequency $F_R$ and the filter normally tracks this signal. With double bounce or multiple bounce signals occurring generally intermittently in short bursts, the closed loop response of the filter system is made slow enough so that the percentage dead time is not materially changed by the intermittent presence of $F_R'$. It should be noted that if only double bounce is considered a percentage dead time of less than 50% causes the filter circuit 26 to be ineffective. Further, since the ratio of $F_R'/F_R$ decreases as altitude decreases, a minimum altitude exists for a lower percentage dead time below which the filter is not effective. A greater percentage dead time lowers the minimum altitude. However, there are limits in that the percentage dead time must be less than 100% since larger values than 100% would count down $F_R$. Other factors limiting maximum percentage dead time are factors such as system noise and dynamic tracking lag due to changing ground clearance.

The filter monitor circuit 36 is added to the filter system not only to provide warning in the event of component failure in the filter circuit but primarily, and more importantly, to warn of the ambiguous condition that may arise with respect to $F_R'$. With the filter tracking $F_R$ at any given time and $F_R$ suddenly increases by more than 1.67 times for a 60% dead time, as for instance when the aircraft is flying a path that passes over the edge of a cliff therebeneath, the filter output may be in a count down condition subject to correction by a monitor circuit voltage input signal to the comparator circuit.

Figure 7:
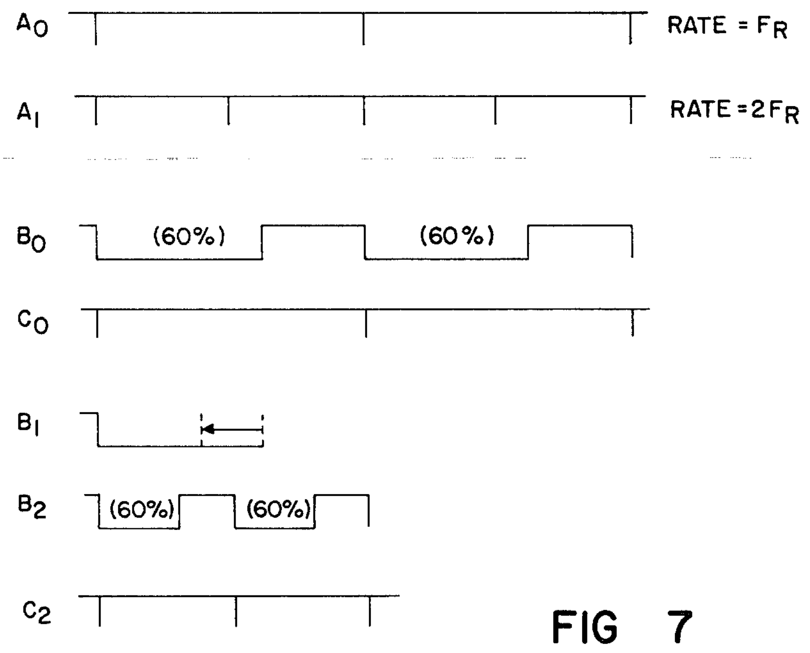

The $A_0$, $B_0$, and $C_0$ waveforms of FIGURE 7 represent normal tracking of the filter circuit 26. If, however, the input rate is doubled as illustrated by waveform $A_1$ of FIGURE 7 with a resulting rate of $2F_R$, with respect to an immediately preceding $A_0$ signal at the rate of $F_R$, with respect to the response time of the closed loop, a stable condition still exists in conformance with the waveforms $A_1$ $B_0$, and $C_0$. This is with the closed loop relationship being satisfied since every other trigger of the $A_1$ pulsed $2F_R$ rate waveform falls in the dead time gate and the monostable multivibrator circuit output provides the normal dead time to the control loop involved. Obviously, the counter triggers at $C_0$ are at a half frequency and a serious error exists. The filter monitor circuit 36 is particularly designed to handle this eventuality and is designed to have a reaction delay period of approximately a half a second since double bounce and multiple bounce is generally of relatively short duration very seldom lasting beyond a period of one-half second. The filter monitor circuit 36 compares the trigger rate input waveform $A_1$ with the pulsed waveform output of the multivibrator circuit 30 and if it detects a count down condition extending beyond approximately one-half second delay period an output to the flag alarm 37 is provided and a corrective voltage pulse is fed back to the comparator circuit 33. This momentarily shortens the dead time of the multivibrator circuit via the comparator circuit and its feedback input to the monostable multivibrator circuit 30 so that immediately no input pulses as this occurs continue to fall under the gate as illustrated in waveform $B_1$ of FIGURE 7. There is an immediate readjustment to the normal loop action of the multivibrator circuit 30 signal output through the low pass filter 32 to comparator circuit 33 where it is compared to the DC reference voltage 34 in developing a feedback dead time control voltage through feedback control line 35 to the monostable multivibrator 30. This results in a monostable multivibrator output waveform such as the $B_2$ multivibrator waveform still with a 60% dead time consistent with the $2F_R$ frequency rate to ultimately develop a correct counter trigger rate as illustrated by the $C_2$ waveform of FIGURE 7. As this is attained, since the two inputs to the filter monitor circuit are again in proper balance and equal frequency-wise the filter is corrected and the alarm signal is removed.

Figure 8:
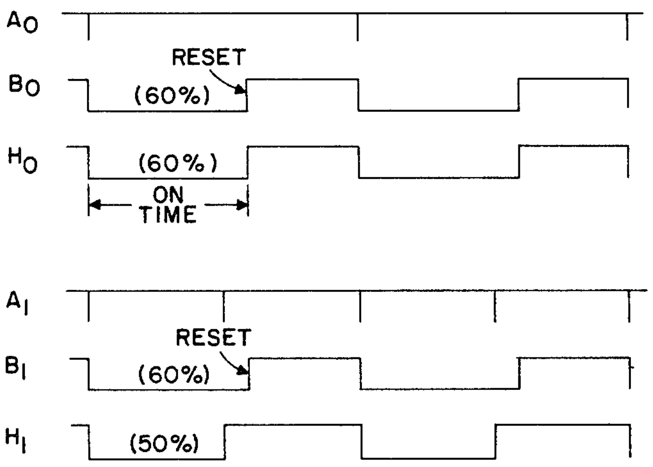
FIGURE 8, another series of voltage versus time waveforms illustrating operational action of the filter monitor circuit.

Referring to the filter monitor circuit 36 in more detail in FIGURES 5 and 6 the RT flip-flop circuit 38 thereof has two inputs, one the T or toggle input where each input changes the state of the flip-ffop and the R or reset input where each input resets the flip-flop if the flip-flop is set prior to the input, or does nothing if the flip-flop is already reset prior to the input. The toggle input is driven by the filter input trigger waveform $A_0$ and the reset input is driven from the trailing edge of the multivibrator gate waveform $B_0$. Referring also now to the waveforms of FIGURE 8 and first the $A_0$, $B_0$, and $H_0$ waveforms, it follows that when the filter operation is normal the output of the flip-flop the $H_0$ waveform is identical to the output of the multivibrator waveform $B_0$. The resulting waveform output of the RT flip-flop circuit 38 is passed to low pass filter circuit 39 and the DC voltage developed by the low pass filter circuit 39 is passed as a controlling input to switch circuit 40. This voltage for controlling the switch 40 out of low pass filter 39 is a function of the percentage "on" time of the H waveforms and for normal filter operation at any value of $F_R$ is a constant value that does not operate the switch. If, however, the filter counts down as shown by the waveforms $A_1$, $B_1$, and $H_1$ of FIGURE 8, the output of the flip-flop 38 has an "on" time of 50% unlike the filter multivibrator output waveforms $B_0$ or $B_1$. The reset input does nothing in this case because the flip-flop circuit 38 is already reset by the previous toggle input at the time of the reset input. The output of the low pass filter is now at a voltage level consistent with $F_R$ but it is at a different value than that obtained for the case of normal filter action so that the swich is activated and the alarm is provided. The step of voltage that occurs when the switch toggles under these conditions is differentiated through differentiator 41 with only one output pulse being provided as a corrective input to the comparator circuit 33 whenever the switch toggles from a normal to an alarm condition. This pulse output from the differentiator circuit 41 to comparator circuit 33 changes the DC voltage in the filter loop momentarily in such a direction as to shorten the multivibrator gate and thus thereby restore the filter to proper operation. After the filter corrects, the flip-flop circuit 38 output presents a proper gate to the low pass filter 39, and the switch circuit 40 toggles off with the alarm thereby being removed.

The filter monitor circuit 36 is capable of detecting a filter fault in the general case where the filter dead time is ranging somewhere between the limits of 50% to 100%. Please note that the "on" time of the flip-flop circuit 38 is always substantially 50% during a fault condition, and that the switch acting under these conditions as a comparator must be capable of acting with smaller voltage differentials developed as filter "dead time" is reduced toward the 50% lower limit. To reiterate, an important consideration with regard to the monitor circuit 36 lies in the fact that the filter is acting generally in the same way while double bounce, which is intermittent generally, is being filtered and during the steady state fault condition. After an interval of approximately a half a second the filter is caused to count down incoming triggers when there is a frequency change in the input in the increasing frequency direction with a sudden increase in apparent altitude over the terrain. Generally, it may be stated that while double bounce is being filtered no flag alarm or filter correction can be tolerated and that, as a rule, the monitor does not cause a flag alarm when double bounce is being filtered because of the intermittent nature of double bounce and the filtering action of the low pass filter 39 of the monitor circuit 36.

Components and values used, in and with a filter circuit for double bounce second signal return filter correction attenuation with a swept FMCW radio altimeter according to the invention, includes the following:

| | | |
|---|---|---|
| Capacitor 42 | picofarads | 130 |
| NPN transistors 43, 48, 49, 50, 51, and 52 | | 2N2540 |
| Resistors 44 and 76 | ohms | 1.8K |
| Resistor 45 | do | 5.6K |
| Positive voltage supply 46 | volts | +30 |
| Diodes 47, 73, 82, 86, 93, 96, 97, 112, 122 and 123 | | 1N3064 |
| Resistors 53, 59, 99, and 106 | ohms | 4.7K |
| Capacitor 54 | microfarads | 22 |
| Resistor 55 | ohms | 270 |
| PNP transistors 56, 58 and 116 | | 2N2907A |
| Adjustable tap resistor 61 | ohms | 500 |
| Resistor 62 | do | 5.11K |
| Resistor 63 | do | 2.15K |
| Resistors 64, 66, 68, 69, 80, 87, 104, 109, 111, 124, and 129 | ohms | 10K |
| Capacitor 67 | microfarad | 1 |
| Resistors 70 and 74 | ohms | 39K |
| Capacitor 57 | microfarads | 82 |
| Capacitors 71, 75, 94, 95, 102, 108 and 110 | picofarads | 20 |
| Resistors 72 and 118 | ohms | 2.2K |
| Resistor 77 | do | 390 |
| Capacitor 78 | picofarads | 390 |
| Resistors 79, 83, 101 and 107 | ohms | 47K |
| Capacitor 81 | picofarads | 330 |
| Resistor 84 | ohms | 196K |
| Capacitors 85 and 121 | microfarads | 0.01 |
| Resistor 88 | ohms | 18K |
| 3.3 volt Zener diodes 89 and 128 | | 1N4370 |
| Capacitor 90 | picofarads | 150 |
| Resistor 91 | ohms | 6.8K |
| Resistor 92 | do | 270K |
| Resistors 98, 105 and 114 | do | 22K |
| NPN transistors 100 and 103 | | 2N2540 |
| Capacitor 113 | picofarads | 91 |
| 15 volt Zener diodes 115 and 131 | | 1N965 |
| Resistor 119 | ohms | 3.3K |
| Capacitor 120 | microfarads | 1.5 |
| Resistor 123 | ohms | 100K |
| NPN transistor 125 | | 2N956 |
| Capacitors 126 and 130 | microfarads | 47 |
| Resistor 127 | ohms | 27K |
| Resistor 132 | do | 15K |

Whereas this invention is here illustrated and described with respect to a specific embodiment thereof, it should be realized that various changes may be made without departing from the essential contributions to the art made by the teachings hereof.

We claim:

1. A filter circuit including a multivibrator circuit with variable gating, including: a variable frequency trigger pulse signal source connection for application of an input to said filter circuit and to said multivibrator circuit; said multivibrator producing a square wave output with a predetermined percentage dead time period under 100%; a voltage comparator circuit connected to the output of said multivibrator; an adjustable reference voltage source connected to said voltage comparator circuit; said voltage comparator circuit having an output voltage signal feedback connection with said multivibrator; and said multivibrator being subject to control activation by a voltage signal from said comparator circuit; and with the activation periods and substantially coexistent percentage dead time periods being adjustable to a predetermined percentage of input signal cycle periods under 100% of the input signal cycle periods by adjustment of said adjustable reference voltage source.

2. The filter circuit of claim 1, also including: a monitor circuit connected to receive as inputs the same variable frequency trigger pulse signal applied as an input to said filter circuit, and an output of said multivibrator circuit as an input; circuit means sensing an unbalance between signal inputs to the monitor circuit; time delay means subject to voltage accumulation connected to said circuit means sensing an unbalance between signal inputs to the monitor circuit; switch trigger circuit means subject to activation by predetermined voltage levels connected to said time delay means; and a differentiator circuit connected to said trigger circuit means and to said comparator circuit for supplying a voltage signal to said comparator circuit when said trigger circuit means is activated.

3. The filter circuit of claim 2, wherein said trigger circuit means of the monitor circuit is provided with a connection to an alarm for activation of the alarm throughout periods of activation of said trigger circuit means.

4. The filter circuit of claim 1, as part of a radio altimeter system wherein: the radio altimeter system includes an interconnected RF transmitter and a receiver and utilizes the swept FMCW principle of operation with a sample of the transmitted signal and the received signal reflected from the ground mixed in the receiver to develop a difference frequency; and said variable frequency trigger pulse signal source includes circuit means for developing a trigger pulsed signal at the same frequency as said difference frequency.

5. The radio altimeter system of claim 4, wherein the trigger pulses of said signal source passed as an input to said filter are each of less pulse width than the narrowest dead time period experienced at the highest operational difference frequency.

6. The radio altimeter system of claim 5, wherein the percentage dead time periods are set to track at approximately 60% of the input signal cycle periods.

7. The radio altimeter system of claim 4, wherein the filter circuit has an output connection to means developing an indication subject to variation as determined by the frequency of the signal output from said filter circuit.

8. The radio altimeter system of claim 7, wherein said means developing an indication subject to variation includes a counter circuit, and an indicator; and with the counter circuit having an output connection for driving the indicator.

9. The radio altimeter system of claim 8, also including: a monitor circuit connected to receive as inputs the same variable frequency trigger pulse signal applied as an input to said filter circuit, and an output of said multivibrator circuit as an input; circuit means sensing an unbalance between signal inputs to the monitor circuit; time delay means subject to voltage accumulation connected to said circuit means sensing an unbalance between signal inputs to the monitor circuit; switch trigger circuit means subject to activation by predetermined voltage levels connected to said time delay means; and a differentiator circuit connected to said trigger circuit means and to said comparator circuit for supplying a voltage signal to said comparator circuit when said trigger circuit means is activated.

10. The radio altimeter system of claim 9 wherein a flag alarm circuit is provided that is connected to an output of said trigger circuit means of the monitor circuit to provide a flag alarm substantially throughout periods of activation of said trigger circuit means.

References Cited

UNITED STATES PATENTS

| | | | |
|---|---|---|---|
| 3,341,849 | 9/1967 | Cordry et al. | 343—14 |
| 3,344,423 | 9/1967 | Thue | 343—14 |

RODNEY D. BENNETT, *Primary Examiner.*

R. E. BERGER, *Assistant Examiner.*